(12) United States Patent
Montoya et al.

(10) Patent No.: US 9,228,086 B2
(45) Date of Patent: Jan. 5, 2016

(54) SILOXANE BASED HOLLOW FIBERS

(71) Applicant: MedArray, Inc., Ann Arbor, MI (US)

(72) Inventors: Jean Patrick Montoya, Ann Arbor, MI (US); Peiyuan Li, Ann Arbor, MI (US); Victor M. Montoya, Ann Arbor, MI (US)

(73) Assignee: MedArray, Inc., Ann Arbor, MI (US)

( * ) Notice: Subject to any disclaimer, the term of this patent is extended or adjusted under 35 U.S.C. 154(b) by 272 days.

(21) Appl. No.: 13/829,161

(22) Filed: Mar. 14, 2013

(65) Prior Publication Data

US 2014/0220344 A1 Aug. 7, 2014

Related U.S. Application Data

(60) Provisional application No. 61/760,857, filed on Feb. 5, 2013.

(51) Int. Cl.

| | | |
|---|---|---|
| *C08G 77/08* | (2006.01) | |
| *C08L 83/04* | (2006.01) | |
| *C08K 9/06* | (2006.01) | |
| *D01D 5/24* | (2006.01) | |
| *D01F 1/10* | (2006.01) | |
| *D01F 6/76* | (2006.01) | |
| *C08K 5/5419* | (2006.01) | |
| *C08K 5/5425* | (2006.01) | |

(52) U.S. Cl.
CPC . *C08L 83/04* (2013.01); *C08K 9/06* (2013.01); *D01D 5/24* (2013.01); *D01F 1/10* (2013.01); *D01F 6/76* (2013.01); *C08K 5/5419* (2013.01); *C08K 5/5425* (2013.01); *Y10T 428/2975* (2015.01)

(58) Field of Classification Search
CPC .... C08K 5/5419; C08K 5/5325; C08L 83/04; D01F 6/76
See application file for complete search history.

(56) References Cited

U.S. PATENT DOCUMENTS

| | | | |
|---|---|---|---|
| 5,698,161 A | 12/1997 | Montoya | |
| 5,964,725 A * | 10/1999 | Sato et al. | 604/4.01 |
| 6,342,324 B1 * | 1/2002 | Li et al. | 430/67 |
| RE41,870 E | 10/2010 | Montoya | |
| 8,557,159 B2 | 10/2013 | Montoya | |
| 2004/0116593 A1 * | 6/2004 | Lai et al. | 524/588 |
| 2008/0044670 A1 * | 2/2008 | Nguyen | 428/447 |
| 2009/0115075 A1 * | 5/2009 | Kessel et al. | 257/787 |
| 2013/0040073 A1 * | 2/2013 | Pett et al. | 427/596 |

OTHER PUBLICATIONS

Kawahito, S. et al., Development of a New Hollow Fiber Silicone Membrane Oxygenator for ECMO: The Recent Progress, *Ann. Thorac. Cardiovasc. Surg.*, 8(5): 268-74, 2002.

* cited by examiner

*Primary Examiner* — Margaret Moore
(74) *Attorney, Agent, or Firm* — Dinsmore & Shohl LLP

(57) ABSTRACT

The present invention provides inventive hollow fibers having defined gas permeability characteristics. Hollow fibers of the present invention are characterized by a $PMP_{CO2}$ greater than 30,000 Barrer*MPa. Curable compositions and silicone elastomers produced by curing the curable compositions are provided by the present invention. Compositions and methods for making the hollow fibers and devices incorporating them are provided by the present invention.

6 Claims, 3 Drawing Sheets

SILOXANE BASED HOLLOW FIBERS

REFERENCE TO RELATED APPLICATION

This application claims priority from U.S. Provisional Patent Application Ser. No. 61/760,857, filed Feb. 5, 2013, the entire content of which is incorporated herein by reference.

GRANT REFERENCE

This invention was made in part with Government support under SBIR Grant No. 5R44-HL082083 awarded by the PHS. The Government may have certain rights in the invention.

FIELD OF THE INVENTION

The present invention relates generally to hollow fibers having defined gas permeability characteristics. In specific aspects, the present invention relates to hollow fibers characterized by a $PMP_{CO2}$ greater than 30,000 Barrer*MPa, compositions and methods for making the hollow fibers and devices incorporating them

BACKGROUND OF THE INVENTION

Gas permeable membranes configured as hollow fibers provide many advantages over flat-sheet membranes for packaging the membrane into modules.

However, in a hollow fiber configuration the membrane material must provide sufficient strength for the hollow fiber to maintain its shape when subject to pressure forces if no additional support layer is desired. There is a continuing need for materials characterized by a $PMP_{CO2}$ greater than 30,000 Barrer*MPa and capable of use in forming hollow fibers.

SUMMARY OF THE INVENTION

Curable compositions for forming silicone hollow fibers with a $PMP_{CO2}$ greater than 30,000 Barrer*MPa, are provided according to the present invention which include:
a) one or more siloxane polymers having the structural formula:

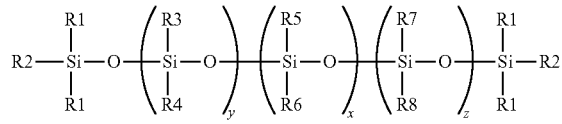

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
b) at least one reinforcing filler selected from:
 i. a particulate filler; and
 ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

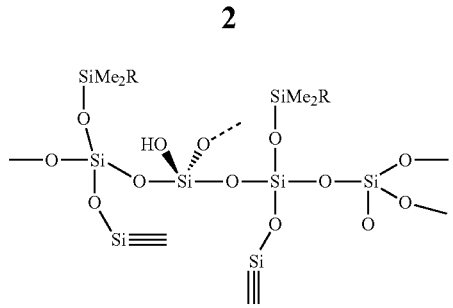

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and
c) a catalyst.

Curable compositions for forming silicone hollow fibers with a $PMP_{CO2}$ greater than 30,000 Barrer*MPa, are provided according to the present invention which include:
a) one or more siloxane polymers having the structural formula:

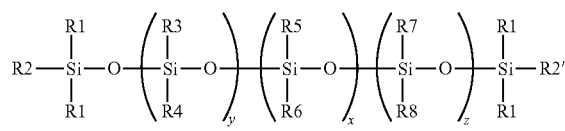

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
b) at least one reinforcing filler selected from:
 i. a particulate filler; and
 ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

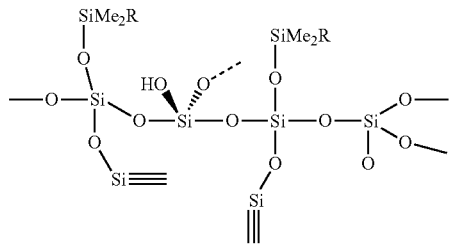

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and combinations of any two or more thereof;

c) a catalyst; and
d) one or more siloxane polymers having the structural formula:

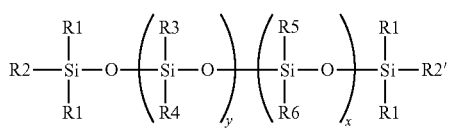

where each R1, R2, R2', R3, R4, R5 and R6 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where x is absent or is an integer in the range of 1-1000, inclusive; and where y is an integer in the range of 1-2000, inclusive.

Curable compositions for forming silicone hollow fibers with a $PMP_{CO2}$ greater than 30,000 Barrer*MPa, are provided according to the present invention which include:
a) one or more siloxane polymers having the structural formula:

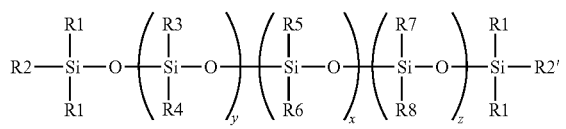

where each R1, R2, R2', R3, R4, R5 and R6 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate and acrylate, x is an integer in the range of 2-2500, inclusive, y is absent or is an integer in the range of 1-1000, inclusive, and z is absent;
b) at least one reinforcing filler selected from:
   i. a particulate filler; and
   ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

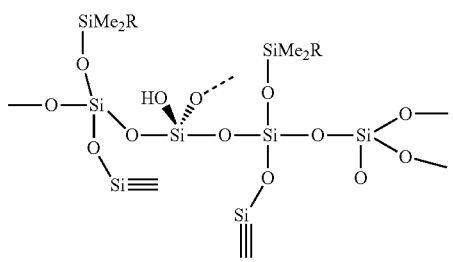

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and
c) a catalyst.

Curable compositions for forming silicone hollow fibers with a $PMP_{CO2}$ greater than 30,000 Barrer*MPa, are provided according to the present invention which include:

a) one or more siloxane polymers having the structural formula:

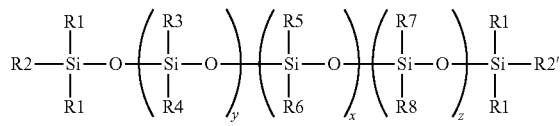

where each R1, R2, R2', R3, R4, R5, R6, R7 and R8 is independently selected from the group consisting of: $CH_3$, $CH_2CH_3$, $CH_2CH_2CH_3$, $CH_2CH_2Cl_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
b) at least one reinforcing filler selected from:
   i. a particulate filler; and
   ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

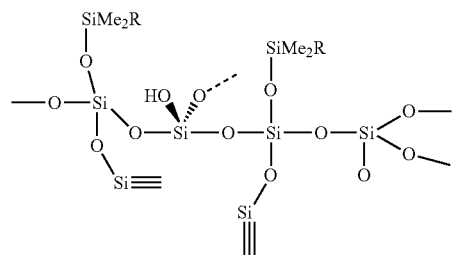

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and
c) a catalyst.

Curable compositions for forming silicone hollow fibers with a $PMP_{CO2}$ greater than 30,000 Barrer*MPa, are provided according to the present invention which include:
a) one or more siloxane polymers having the structural formula:

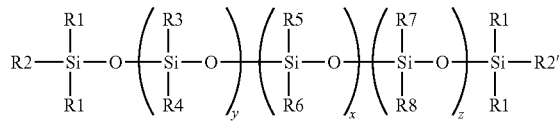

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

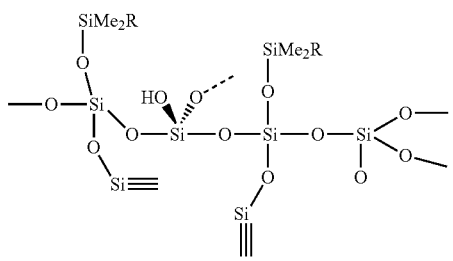

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and combinations of any two or more thereof;
c) a catalyst; and
d) one or more siloxane polymers having the structural formula:

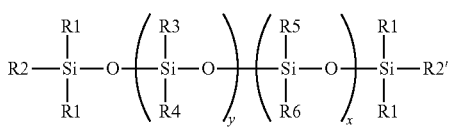

where each R1, R2, R2', R3, R4, R5 and R6 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate, and H, x is an integer in the range of 3-100, inclusive, and y is absent or is an integer in the range of 1-1000, inclusive.

Curable compositions for forming silicone hollow fibers with a $PMP_{CO2}$ greater than 30,000 Barrer*MPa, are provided according to the present invention which include:
a) one or more siloxane polymers having the structural formula:

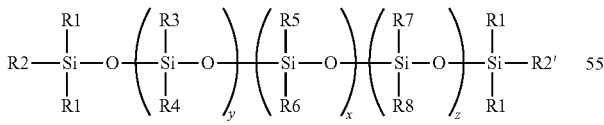

where each R1, R2, R2', R3, R4, R5 and R6 is independently selected from the group consisting of: $CH_3$, $OCH_3$, $CH_2CH_3$, $CH=CH_2$ and OH; x is an integer in the range of 100-2200, inclusive; y is absent or is an integer in the range of 1-200, inclusive; and z is absent;
b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

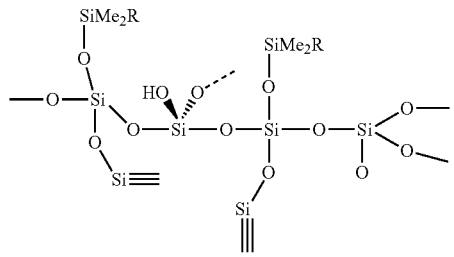

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and
c) a catalyst.

Curable compositions for forming silicone hollow fibers with a $PMP_{CO2}$ greater than 30,000 Barrer*MPa, are provided according to the present invention which include:
a) one or more siloxane polymers having the structural formula:

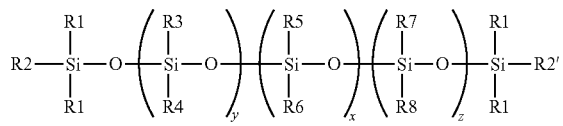

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

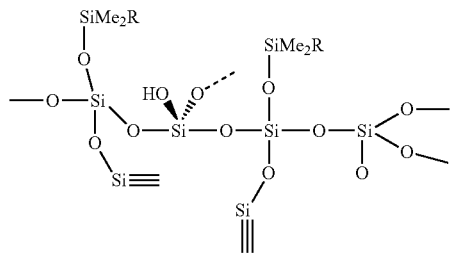

where each R is independently selected from the group consisting of: $CH_3$, $CH_2CH_3$, $CH_2CH_2CH_3$, CH$_2$CH$_2$CH$_2$CH$_3$, CH$_2$CH$_2$F$_3$, phenyl, CH═CH$_2$, OH, epoxy, carbinol, methacrylate, acrylate and H;
and combinations of any two or more thereof;
c) a catalyst; and
d) one or more siloxane polymers having the structural formula:

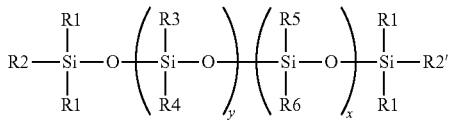

where each R1 is independently selected from the group consisting of: OCH$_3$, CH$_3$, CH$_2$CH$_3$, CH$_2$CH$_2$CH$_3$, CH$_2$CH$_2$CH$_2$CH$_3$, CH$_2$CH$_2$F$_3$, phenyl, CH═CH$_3$, OH, epoxy, carbinol, methacrylate, acrylate, and H; each R2, R2', R3, R4, R5 and R6 is independently selected from the group consisting of: H and CH$_3$, x is an integer in the range of 3-100, inclusive; and y is absent or is an integer in the range of 1-50, inclusive.

Curable compositions for forming silicone hollow fibers with a PMP$_{CO2}$ greater than 30,000 Barrer*MPa, are provided according to the present invention which include:
a) one or more siloxane polymers having the structural formula:

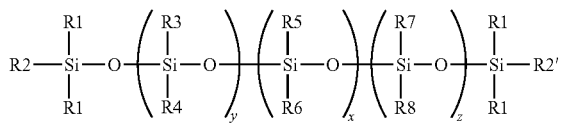

where R2 and R2' are CH═CH$_2$ or where at least one of, R3, R4, R5, R6, R7 and R8 are CH═CH$_2$, with the proviso that at least two CH═CH$_2$ groups are present in the siloxane polymer; where at least one of x, y and z is present, where x is absent or is an integer in the range of 1-2500, inclusive, where z is absent or is an integer in the range of 1-2500, inclusive, and where y is absent or is an integer in the range of 1-20000, inclusive; and where polymer a) is present in an amount in the range of 5-80 parts, inclusive, by weight of the curable composition;
b) reinforcing filler comprising MQ Resin having the structural formula:

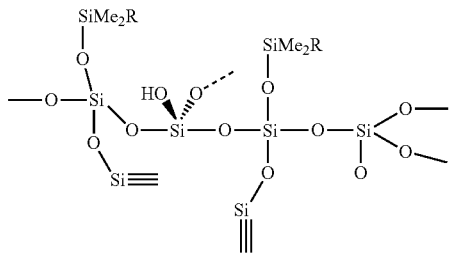

where each R is independently selected from the group consisting of: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH═CH$_2$, OH, epoxy, carbinol, methacrylate, acrylate and H; and combinations of any two or more thereof, wherein the reinforcing filler (b) is present in an amount in the range of 15-85 parts, inclusive; and c) a peroxide catalyst present in sufficient quantity to cure the curable composition.

Curable compositions for forming silicone hollow fibers with a PMP$_{CO2}$ greater than 30,000 Barrer*MPa, are provided according to the present invention which include:
a) one or more siloxane polymers having the structural formula:

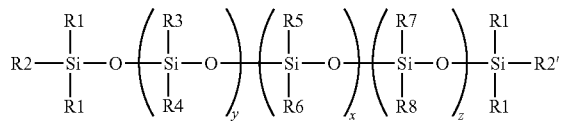

where R2 and R2' are CH═CH$_2$ or where at least one of, R3, R4, R5, R6, R7 and R8 are CH═CH$_2$, with the proviso that at least two CH═CH$_2$ groups are present in the siloxane polymer; where at least one of x, y and z is present, where x is absent or is an integer in the range of 1-2500, inclusive, where z is absent or is an integer in the range of 1-2500, inclusive, and where y is absent or is an integer in the range of 1-20000, inclusive; and where polymer a) is present in an amount in the range of 5-80 parts, inclusive, by weight of the curable composition;
b) reinforcing filler comprising
 i. a particulate filler; and
 ii. MQ Resin having the structural formula:

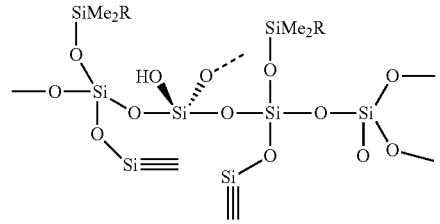

where each R is independently selected from the group consisting of: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH═CH$_2$, OH, epoxy, carbinol, methacrylate, acrylate and H, wherein the reinforcing filler (b) is present in an amount in the range of 15-85 parts, inclusive, by weight of the curable composition; and
c) a peroxide catalyst present in sufficient quantity to cure the curable composition.

Curable compositions for forming silicone hollow fibers with a PMP$_{CO2}$ greater than 30,000 Barrer*MPa, are provided according to the present invention which include:
a) one or more siloxane polymers having the structural formula:

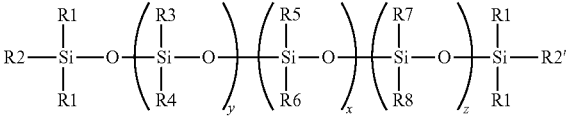

where R2 and R2' are CH═CH$_2$; where at least one of x, y and z is present, where x is absent or is an integer in the range of 1-2500, inclusive, where z is absent or is an integer in the range of 1-2500, inclusive; and where y is absent or is an integer in the range of 1-20000, inclusive; and where polymer a) is present in an amount in the range of 5-80 parts, inclusive, by weight of the curable composition;
b) reinforcing filler comprising MQ Resin having the structural formula:

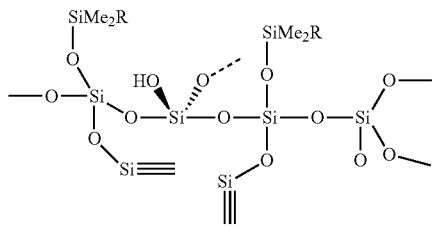

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and combinations of any two or more thereof, wherein the reinforcing filler (b) is present in an amount in the range of 15-85 parts, inclusive;
c) a noble metal catalyst present in sufficient quantity to cure the curable composition;
d) one or more siloxane polymers having the structural formula:

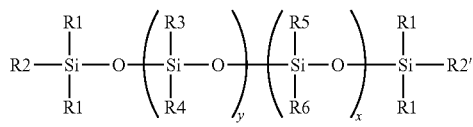

where at least one of R3, R4, R5 and R6 is H; where x is absent or is an integer in the range of 1-1000, inclusive; and where y is an integer in the range of 2-2000, inclusive; and where polymer d) is present in an amount in the range of 5-25 parts, inclusive, by weight of the curable composition; and
an inhibitor bath life extender is present in an amount in the range of 0.5-10 parts, inclusive, by weight of the curable composition;
wherein polymer (a), polymer (d) and reinforcing filler (b) have a combined hydride to vinyl (H:Vi) molar ratio in the range of 1.2:1-4:1, inclusive.

Curable compositions for forming silicone hollow fibers with a $PMP_{CO2}$ greater than 30,000 Barrer*MPa, are provided according to the present invention which include:
a) one or more siloxane polymers having the structural formula:

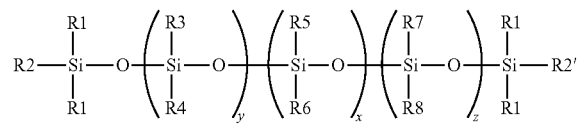

where R2 and R2' are $CH=CH_2$; where at least one of x, y and z is present, where x is absent or is an integer in the range of 1-2500, inclusive, where z is absent or is an integer in the range of 1-2500, inclusive; and where y is absent or is an integer in the range of 1-20000, inclusive; and where polymer a) is present in an amount in the range of 5-80 parts, inclusive, by weight of the curable composition;

b) reinforcing filler comprising
i. a particulate filler; and
ii. MQ Resin having the structural formula:

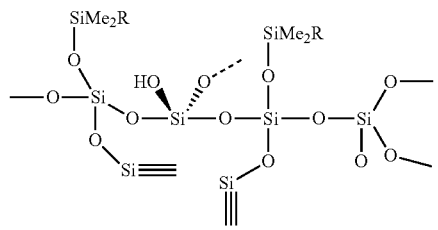

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H, wherein the reinforcing filler (b) is present in an amount in the range of 15-85 parts, inclusive, by weight of the curable composition;
c) a noble metal catalyst present in sufficient quantity to cure the curable composition;
d) one or more siloxane polymers having the structural formula:

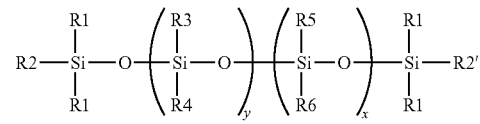

where at least one of R3, R4, R5 and R6 is H; where x is absent or is an integer in the range of 1-1000, inclusive; and where y is an integer in the range of 2-2000, inclusive; and where polymer d) is present in an amount in the range of 5-25 parts, inclusive, by weight of the curable composition; and
an inhibitor bath life extender is present in an amount in the range of 0.5-10 parts, inclusive, by weight of the curable composition;
wherein polymer (a), polymer (d) and reinforcing filler (b) have a combined hydride to vinyl (H:Vi) molar ratio in the range of 1.2:1-4:1, inclusive.

Curable compositions for forming silicone hollow fibers with a $PMP_{CO2}$ greater than 30,000 Barrer*MPa, are provided according to the present invention which include:
a) one or more siloxane polymers having the structural formula:

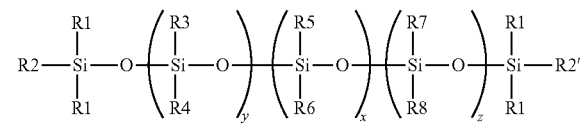

where R2 and R2' are $CH=CH_2$; where at least one of x, y and z is present, where x is absent or is an integer in the range of 1-2500, inclusive, where z is absent or is an integer in the range of 1-2500, inclusive, and where y is absent or is an integer in the range of 1-20000, inclusive; and where polymer a) is present in an amount in the range of 10-70 parts, inclusive, by weight of the curable composition;

b) reinforcing filler comprising MQ Resin having the structural formula:

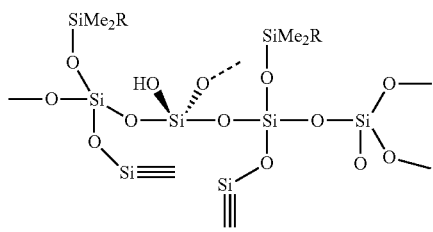

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H, wherein the reinforcing filler (b) is present in an amount in the range of 20-75 parts, inclusive;

c) a platinum catalyst present in an amount in the range of 2-50, inclusive, parts per million by weight of the curable composition;

d) one or more siloxane polymers having the structural formula:

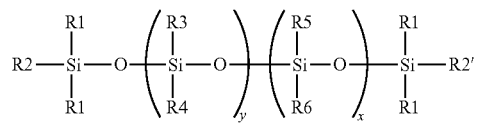

where R3 is H; where x is absent or is an integer in the range of 1-1000, inclusive; and where y is an integer in the range of 1-200, inclusive; and where polymer d) is present in an amount in the range of 8-20 parts, inclusive, by weight of the curable composition;

an inhibitor bath life extender present in an amount in the range of 0.5-5.0 parts, inclusive, by weight of the curable composition;

wherein polymer (a), polymer (d) and reinforcing filler (b) in combination have a hydride to vinyl (H:Vi) molar ratio in the range of 1.5:1-3.5:1, inclusive.

Curable compositions for forming silicone hollow fibers with a $PMP_{CO2}$ greater than 30,000 Barrer*MPa, are provided according to the present invention which include:

a) one or more siloxane polymers having the structural formula:

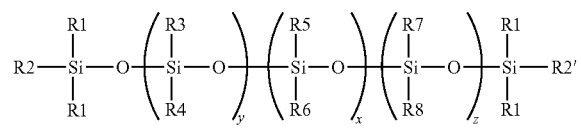

where R2 and R2' are $CHH=CH_2$; where at least one of x, y and z is present, where x is absent or is an integer in the range of 1-2500, inclusive, where z is absent or is an integer in the range of 1-2500, inclusive, and where y is absent or is an integer in the range of 1-20000, inclusive; and where polymer a) is present in an amount in the range of 10-70 parts, inclusive, by weight of the curable composition;

b) reinforcing filler comprising
i. a particulate filler; and
ii. MQ Resin having the structural formula:

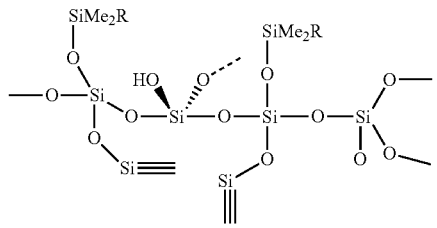

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H, wherein the reinforcing filler (b) is present in an amount in the range of 20-75 parts, inclusive, by weight of the curable composition;

c) a platinum catalyst present in an amount in the range of 2-50, inclusive, parts per million by weight of the curable composition;

d) one or more siloxane polymers having the structural formula:

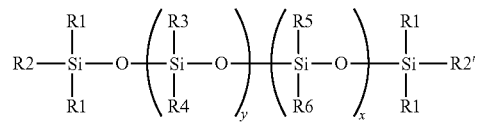

where R3 is H; where x is absent or is an integer in the range of 1-1000, inclusive; and where y is an integer in the range of 1-200, inclusive; and where polymer d) is present in an amount in the range of 8-20 parts, inclusive, by weight of the curable composition;

an inhibitor bath life extender present in an amount in the range of 0.5-5.0 parts, inclusive, by weight of the curable composition;

wherein polymer (a), polymer (d) and reinforcing filler (b) in combination have a hydride to vinyl (H:Vi) molar ratio in the range of 1.5:1-3.5:1, inclusive.

Curable compositions for forming silicone hollow fibers with a $PMP_{CO2}$ greater than 30,000 Barrer*MPa, are provided according to the present invention which include:

a) one or more siloxane polymers having the structural formula selected from the group consisting of:

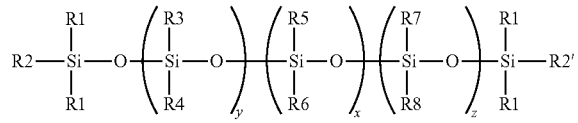

where each R1, R3 and R4 is methyl, where each R2 and R2' is vinyl, where y is an integer in the range of 100-20000, inclusive and where x and z are absent;

where each R1, R3 and R4 is methyl, where each R2 and R2' is methyl, where R5 is vinyl, where R6 is methyl, where y+x is an integer in the range of 100-20000, inclusive, and where z is absent;

where each R1, R3 and R4 is methyl, where each R2 and R2' is vinyl, where R5 is $CH_2CH_2CF_3$, where R6 is methyl, where y+x is an integer in the range of 1-20000, inclusive, and where z is absent;

where each R1, R3 and R4 is methyl, where each R2 and R2' is vinyl, where each R5 and R6 is phenyl, where y+x is an integer in the range of 1-20000, inclusive, and where z is absent;

where each R1, R3 and R4 is methyl, where each R2 and R2' is vinyl, where R5 and R6 is $CH_2CH_3$, where y+x is an integer in the range of 1-20000, inclusive, and where z is absent;

where each R1, R2, R2' R3, R4, R6 and R7 is methyl, where R5 is vinyl, where R8 is phenyl or $CH_2CH_2CF_3$, and where y+x+z is an integer in the range of 1-20000, inclusive;

where each R1, R2, R2' and R4 is methyl, where each R3 is vinyl, where y is an integer in the range of 1-20000, inclusive and where x and z are absent; and where each R1 and R4 is methoxy, where each R2 and R2' is vinyl, where each R3 is vinyl, where y is an integer in the range of 1-20000, inclusive and where x and z are absent;

b) at least one reinforcing filler selected from:
  i. a particulate filler; and
  ii. a silicone resin selected from the group consisting of polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

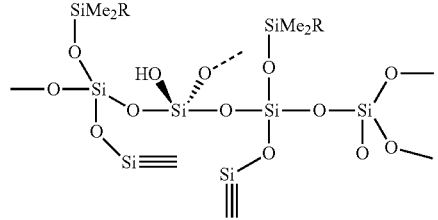

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and c) a catalyst.

Curable compositions for forming silicone hollow fibers with a $PMP_{CO2}$ greater than 30,000 Barrer*MPa, are provided according to the present invention which include:

a) one or more siloxane polymers having the structural formula:

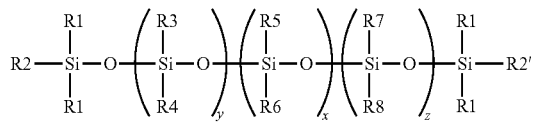

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

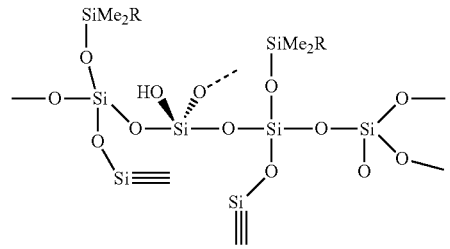

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof;

c) a catalyst; and d) one or more siloxane polymers having the structural formula selected from the group consisting of

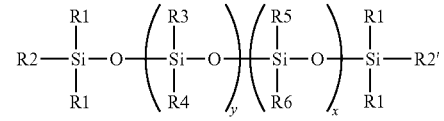

where each R1, R2, R2' and R4 is methyl, where each R3 is H, where y is an integer in the range of 1-100, inclusive and where x is absent;

where each R1, R2, R2', R4, R5 and R6 is methyl, where each R3 is H, where y is an integer in the range of 1-100, inclusive and where x an integer in the range of 1-1000, inclusive;

where each R1, R2, R2' and R4 is $CH_2CH_3$, where each R3 is H, where y is an integer in the range of 1-2000, inclusive and where x is absent; and where each R1, R4 and R6 is methyl, where each R2, R2' and R3 is H, where each R5 is phenyl, where y is an integer in the range of 1-2000, inclusive and where x is an integer in the range of 3-200, inclusive.

Curable compositions for forming silicone hollow fibers with a $PMP_{CO2}$ greater than 30,000 Barrer*MPa, are provided according to the present invention which include:

a) one or more siloxane polymers having the structural formula selected from the group consisting of

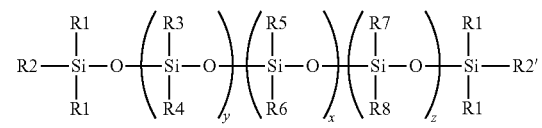

where each R1, R3 and R4 is methyl, where each R2 and R2' is vinyl, where y is an integer in the range of 100-20000, inclusive and where x and z are absent;

where each R1, R3 and R4 is methyl, where each R2 and R2' is methyl, where R5 is vinyl, where R6 is methyl, where y+x is an integer in the range of 100-20000, inclusive, and where z is absent;

where each R1, R3 and R4 is methyl, where each R2 and R2' is vinyl, where R5 is $CH_2CH_2CF_3$, where R6 is methyl, where y+x is an integer in the range of 1-20000, inclusive, and where z is absent;

where each R1, R3 and R4 is methyl, where each R2 and R2' is vinyl, where each R5 and R6 is phenyl, where y+x is an integer in the range of 1-20000, inclusive, and where z is absent;

where each R1, R3 and R4 is methyl, where each R2 and R2' is vinyl, where R5 and R6 is $CH_2CH_3$, where y+x is an integer in the range of 1-20000, inclusive, and where z is absent;

where each R1, R2, R2' R3, R4, R6 and R7 is methyl, where R5 is vinyl, where R8 is phenyl or $CH_2CH_2CF_3$, and where y+x+z is an integer in the range of 1-20000, inclusive;

where each R1, R2, R2' and R4 is methyl, where each R3 is vinyl, where y is an integer in the range of 1-20000, inclusive and where x and z are absent; and where each R1 and R4 is methoxy, where each R2 and R2' is vinyl, where each R3 is vinyl, where y is an integer in the range of 1-20000, inclusive and where x and z are absent;

b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

$$\begin{array}{c} SiMe_2R \\ | \\ O \\ | \\ -O-Si \\ | \\ O \\ | \\ Si\equiv \end{array} \quad HO \quad \begin{array}{c} SiMe_2R \\ | \\ O \\ | \\ O-Si-O-Si-O-Si \\ | \quad | \quad | \\ O \quad O \quad O \\ | \\ Si\equiv\equiv\equiv \end{array} \quad \begin{array}{c} O- \\ \diagdown \\ O- \end{array}$$

where each R is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof;

c) a catalyst; and d) one or more siloxane polymers having the structural formula selected from the group consisting of:

$$R2-\underset{\underset{R1}{|}}{\overset{\overset{R1}{|}}{Si}}-O-\left(\underset{\underset{R4}{|}}{\overset{\overset{R3}{|}}{Si}}-O\right)_y\left(\underset{\underset{R6}{|}}{\overset{\overset{R5}{|}}{Si}}-O\right)_x\underset{\underset{R1}{|}}{\overset{\overset{R1}{|}}{Si}}-R2'$$

where each R1, R2, R2' and R4 is methyl, where each R3 is H, where y is an integer in the range of 1-100, inclusive and where x is absent;

where each R1, R2, R2', R4, R5 and R6 is methyl, where each R3 is H, where y is an integer in the range of 1-100, inclusive and where x an integer in the range of 1-1000, inclusive;

where each R1, R2, R2' and R4 is $CH_2CH_3$, where each R3 is H, where y is an integer in the range of 1-2000, inclusive and where x is absent; and where each R1, R4 and R6 is methyl, where each R2, R2' and R3 is H, where each R5 is phenyl, where y is an integer in the range of 1-2000, inclusive and where x is an integer in the range of 3-200, inclusive.

Curable compositions for forming silicone hollow fibers with a $PMP_{CO2}$ greater than 30,000 Barrer*MPa, are provided according to the present invention which include:

a) one or more siloxane polymers having the structural formula:

$$R2-\underset{\underset{R1}{|}}{\overset{\overset{R1}{|}}{Si}}-O-\left(\underset{\underset{R4}{|}}{\overset{\overset{R3}{|}}{Si}}-O\right)_y\left(\underset{\underset{R6}{|}}{\overset{\overset{R5}{|}}{Si}}-O\right)_x\left(\underset{\underset{R8}{|}}{\overset{\overset{R7}{|}}{Si}}-O\right)_z\underset{\underset{R1}{|}}{\overset{\overset{R1}{|}}{Si}}-R2'$$

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of R1, R2, R2', R3, R4, R5, R6, R7 and R8 is methacrylate or acrylate, where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) at least one reinforcing filler selected from:
  i. a particulate filler; and
  ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

$$\begin{array}{c} SiMe_2R \\ | \\ O \\ | \\ -O-Si \\ | \\ O \\ | \\ Si\equiv \end{array} \quad HO \quad \begin{array}{c} SiMe_2R \\ | \\ O \\ | \\ O-Si-O-Si-O-Si \\ | \quad | \quad | \\ O \quad O \quad O \\ | \\ Si\equiv\equiv\equiv \end{array} \quad \begin{array}{c} O- \\ \diagdown \\ O- \end{array}$$

where each R is independently selected from the group consisting of: $CH_3$, $C_{1-2}CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H;
and combinations of any two or more thereof; and c) a catalyst, wherein the catalyst is a cationic photoinitiator.

Curable compositions for forming silicone hollow fibers with a $PMP_{CO2}$ greater than 30,000 Barrer*MPa, are provided according to the present invention which include:

a) one or more siloxane polymers having the structural formula:

$$R2-\underset{\underset{R1}{|}}{\overset{\overset{R1}{|}}{Si}}-O-\left(\underset{\underset{R4}{|}}{\overset{\overset{R3}{|}}{Si}}-O\right)_y\left(\underset{\underset{R6}{|}}{\overset{\overset{R5}{|}}{Si}}-O\right)_x\left(\underset{\underset{R8}{|}}{\overset{\overset{R7}{|}}{Si}}-O\right)_z\underset{\underset{R1}{|}}{\overset{\overset{R1}{|}}{Si}}-R2'$$

where each R1, R2, R2', R3, R4, R5, R6, R7 and R8 is independently selected from the group consisting of:

CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, OCH$_3$, epoxy, carbinol, methacrylate, acrylate and H; where at least one of R1, R2, R2', R3, R4, R5, R6, R7 and R8 is OH, where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) at least one reinforcing filler selected from:
  i. a particulate filler; and
  ii. a silicone resin selected from the group consisting of: polysilsesquioxane; T-resin of the composition RSiO$_{1.5}$, where R is selected from: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, epoxy, carbinol, methacrylate, acrylate and H; and MQ Resin having the structural formula:

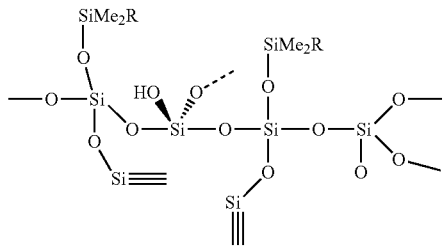

where each R is independently selected from the group consisting of: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, epoxy, carbinol, methacrylate, acrylate and H;
and combinations of any two or more thereof;
c) a catalyst, where the catalyst is a metal salt or peroxide;
d) one or more siloxane polymers having the structural formula:

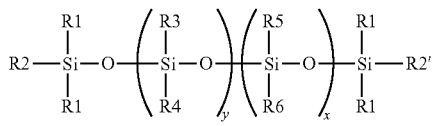

where each R1, R2, R2', R3, R4, R5 and R6 is independently selected from the group consisting of: CH$_3$, CH$_2$CH$_3$, CH$_2$CH$_2$CH$_2$CH$_2$CH$_2$CH$_3$, CH$_2$CH$_2$F$_3$, phenyl, CH=CH$_2$, OH, OCH$_3$, epoxy, carbinol, methacrylate, acrylate and H; where for polymer
(d) at least one of R1, R2, R2', R3, R4, R5 and R6 is OH or H, where x is absent or is an integer in the range of 1-1000, inclusive; and where y is an integer in the range of 1-2000, inclusive; and
further including an acetoxy crosslinking agent.

Curable compositions for forming silicone hollow fibers with a PMP$_{CO2}$ greater than 30,000 Barrer*MPa, are provided according to the present invention which include:
a) one or more siloxane polymers having the structural formula:

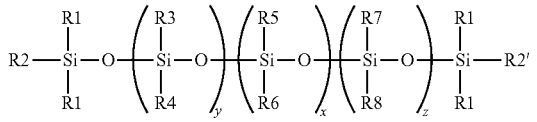

where each R1, R2, R2', R3, R4, R5, R6, R7 and R8 is independently selected from the group consisting of: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, OCH$_3$, epoxy, carbinol, methacrylate, acrylate and H; where at least one of R1, R2, R2', R3, R4, R5, R6, R7 and R8 is OH, where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) at least one reinforcing filler selected from:
  i. a particulate filler; and
  ii. a silicone resin selected from the group consisting of: polysilsesquioxane; T-resin of the composition RSiO$_{1.5}$, where R is selected from: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, epoxy, carbinol, methacrylate, acrylate and H; and MQ Resin having the structural formula:

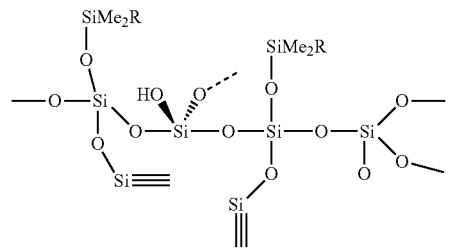

where each R is independently selected from the group consisting of: CH$_3$, CH$_2$CH$_3$, CH$_2$CH$_2$CH$_3$, CH$_2$CH$_2$CH$_2$CH$_3$, CH$_2$CH$_2$F$_3$, phenyl, CH=CH$_2$, OH, epoxy, carbinol, methacrylate, acrylate and H;
and combinations of any two or more thereof;
c) a catalyst, where the catalyst is moisture;
and further including a crosslinking agent selected from: acetoxy, oxime, enoxy or alkoxy.

Any of the curable compositions for forming silicone hollow fibers with a PMP$_{CO2}$ greater than 30,000 Barrer*MPa, according to the present invention optionally further include a component selected from the group consisting of: an inhibitor bath life extender, a solvent, an additional filler, a pigment, a dye and a combination of any two or more thereof.

Inhibitor bath life extenders included in curable compositions for forming silicone hollow fibers with a PMP$_{CO2}$ greater than 30,000 Barrer*MPa, according to aspects of the present invention are selected from: 1,3-divinyltetramethyldisiloxane; 1,3,5,7-tetravinyl-1,3,5,7-tetramethyl cyclotetrasiloxane; a low molecular weight cyclic vinylmethylsiloxane homopolymer, a low molecular weight linear vinylmethylsiloxane homopolymer, an acetylenic alcohol and a combination of two or more thereof.

Optionally, curable compositions for forming silicone hollow fibers with a PMP$_{CO2}$ greater than 30,000 Barrer*MPa, according to the present invention include an inhibitor bath life extender is present in an amount in the range of 0.5-10 parts, inclusive, by weight of the curable composition.

Curable compositions for forming silicone hollow fibers with a PMP$_{CO2}$ greater than 30,000 Barrer*MPa, are provided according to the present invention which include:
a) one or more siloxane polymers having the structural formula:

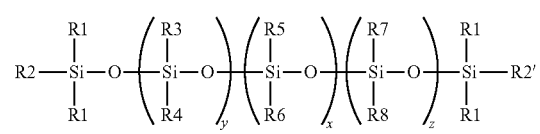

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2F_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) at least one reinforcing filler selected from:
   i. a particulate filler; and
   ii. a silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2F_3$, phenyl, $CH=CH_2$, OH, epoxy, carbinol, methacrylate, acrylate and H; and MQ Resin having the structural formula:

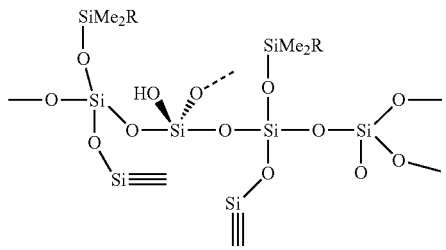

where each R is independently selected from the group consisting of: $CH_3$, $CH_2CH_3$, $CH_7CH_2CH_3$, $CH_2CH_2CH_2CH_3$, $CH_2CH_2F_3$, phenyl, $CH=CH_2$, OH, epoxy, carbinol, methacrylate, acrylate and H;

and combinations of any two or more thereof; and c) a catalyst, wherein the catalyst is a noble metal catalyst or peroxide catalyst.

A particulate filler included in curable compositions according to aspects of the present invention is selected from the group consisting of: a surface treated fumed silica, a non-surface treated fumed silica and a combination of any two or more thereof.

A particulate filler included in curable compositions according to aspects of the present invention is hexamethyldisilazane treated fumed silica.

An MQ Resin included in curable compositions according to aspects of the present invention has the structural formula:

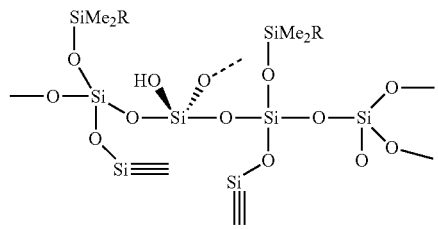

where each R is independently selected from the group consisting of: $CH_3$, $CH=CH_2$ and H.

An MQ Resin included in curable compositions according to aspects of the present invention has the structural formula:

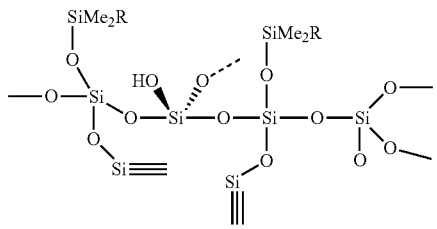

where each R is $CH=CH_2$.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; a vinyl functional Q resin, wherein the vinyl functional Q resin is present in an amount up to 80 parts per hundred by weight of the curable composition; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; a hydride functional. Q resin; wherein the hydride functional Q resin is present in an amount up to 80 parts per hundred by weight of the curable composition; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; a vinylmethylsiloxane cyclic monomer; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 10,000-200,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; and a platinum catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive and further including a component selected from the group consisting of: an inhibitor bath life extender, a solvent, an additional filler, a pigment, a dye and a combination of any two or more thereof.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive and further including an inhibitor bath life extender selected from the group consisting of: 1,3-divinyltetramethyldisiloxane; 1,3,5,7-tetravinyl-1,3,5,7-tetramethyl cyclotetrasiloxane; a low molecular weight cyclic vinylmethylsiloxane homopolymer, a low molecular weight linear vinylmethylsiloxane homopolymer, an acetylenic alcohol and a combination of two or more thereof.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; a fumed silica filler present in an amount in the range of 5 to 50, inclusive, parts per hundred by weight of the curable composition selected from the group consisting of: a surface treated fumed silica, a non-surface treated fumed silica and a combination of any two or more thereof; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive.

Curable compositions for forming silicone hollow fibers with a $PMP_{CO2}$ greater than 30,000 Barrer*MPa are provided according to aspects of the present invention which include: a vinyl terminated silicone having a molecular weight in the range of 5,000-1,500,000 Daltons present in an amount in the range of 10 to 70 parts per hundred by weight of the curable composition; hexamethyldisilazane treated fumed silica present in an amount in the range of 5 to 50, inclusive, parts per hundred by weight of the curable composition; a polymethylhydrosiloxane having a molecular weight in the range of 900-4000 Daltons, inclusive; and a noble metal catalyst in a catalytic quantity, wherein the ratio by mole of hydride functional groups to vinyl functional groups contained in all components of the curable composition is in the range of 1.5:1-4:1, inclusive.

Silicone elastomers obtained by curing the curable compositions of the present invention are provided along with articles of manufacture incorporating or formed from the silicone elastomers.

Silicone hollow fiber are provided according to the present invention which have a wall, the wall generally enclosing and defining an interior space, the wall having an internal surface adjacent the interior space and an opposed external surface, the wall extending between a first end and a second end; the wall comprising a reaction product of a curable composition of the present invention, the wall of the silicone hollow fiber characterized by a $PMP_{CO2}$ greater than 30,000 Barrer*MPa.

Silicone hollow fiber are provided according to the present invention which have a wall, the wall generally enclosing and defining an interior space, the wall having an internal surface adjacent the interior space and an opposed external surface, the wall extending between a first end and a second end; the wall comprising a reaction product of a curable composition of the present invention, the wall of the silicone hollow fiber characterized by a $PMP_{CO2}$ greater than 50,000 Barrer*MPa.

Silicone hollow fiber are provided according to the present invention which have a wall, the wall generally enclosing and defining an interior space, the wall having an internal surface adjacent the interior space and an opposed external surface, the wall extending between a first end and a second end; the wall comprising a reaction product of a curable composition of the present invention, the wall of the silicone hollow fiber characterized by a $PMP_{CO_2}$ greater than 70,000 Barrer*MPa.

Bundles of silicone hollow fibers are provided according to the present invention wherein each fiber in the bundle has a wall, the wall generally enclosing and defining an interior space, the wall having an internal surface adjacent the interior space and an opposed external surface, the wall extending between a first end and a second end; the wall comprising a reaction product of a curable composition of the present invention, the wall of each silicone hollow fiber characterized by a $PMP_{CO_2}$ greater than 30,000 Barrer*MPa.

Bundles of silicone hollow fibers are provided according to the present invention wherein each fiber in the bundle has a wall, the wall generally enclosing and defining an interior space, the wall having an internal surface adjacent the interior space and an opposed external surface, the wall extending between a first end and a second end; the wall comprising a reaction product of a curable composition of the present invention, the wall of each silicone hollow fiber characterized by a $PMP_{CO_2}$ greater than 50,000 Barrer*MPa.

Bundles of silicone hollow fibers are provided according to the present invention wherein each fiber in the bundle has a wall, the wall generally enclosing and defining an interior space, the wall having an internal surface adjacent the interior space and an opposed external surface, the wall extending between a first end and a second end; the wall comprising a reaction product of a curable composition of the present invention, the wall of each silicone hollow fiber characterized by a $PMP_{CO_2}$ greater than 70,000 Barrer*MPa.

DETAILED DESCRIPTION OF THE INVENTION

Figure 1:
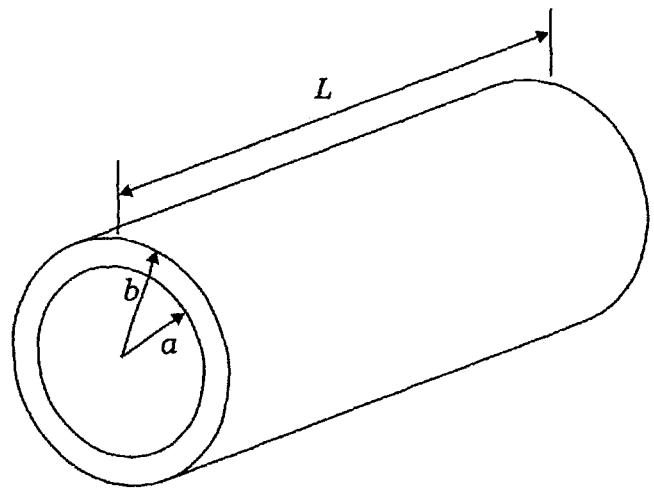
FIG. 1 is a diagram of a hollow fiber.

Gas permeable membranes configured as hollow fibers provide many advantages over flat-sheet membranes for packaging the membrane into modules. The primary advantage is that the module's membrane surface area density (membrane area/module volume) can be up to ten times as high with hollow fiber membranes compared to spiral wound membranes.

One disadvantage of the hollow fiber configuration is that the membrane material must provide sufficient strength for the hollow fiber to maintain its shape if no additional support layer is desired; the hollow fiber must maintain its shape when there is a pressure difference between the inside of the hollow fiber relative to the outside of the hollow fiber or a trans-membrane pressure (TMP). Spiral wound packaged flat membranes are inherently able to tolerate pressure differences between one side of the membrane relative to the other because the pressure in adjacent layers of the spiral act in opposite directions canceling out a net force on the membrane, but spacers must be placed in between adjacent layers to prevent contact of the membrane layers under compressive forces.

Hollow fibers can deform (collapse or expand) to the point of failure if the pressure difference between the inside and the outside of the hollow fiber exceeds a certain level. The mechanical properties of the hollow fiber (i.e., modulus of elasticity, E), and the fiber geometry (outside diameter and wall thickness) will determine how much the hollow fiber will deflect when exposed to a TMP. When the fiber is exposed to a positive TMP, defined here as when the internal pressure is higher than the external pressure, the deformation a hollow fiber will undergo can be calculated using the equation for deformation for a cylindrical pressure vessel under internal pressure (Higdon, 1976)

$$\delta = \frac{2a^2 b \Delta P}{E(b^2 - a^2)} \quad [1]$$

Where $\delta$ is the radial deflection at the fiber's outside radius b, a is the inside radius, $\Delta P$ is the positive trans-membrane pressure (TMP), and E is the modulus of elasticity. Solving for radial strain $\epsilon$ at the outer radius b, $$\epsilon = \frac{\delta}{b} = \frac{2a^2 \Delta P}{E(b^2 - a^2)} \quad [2]$$

Or in terms of the ratio of the inner radius to the outer radius r=a/b, $$\epsilon = \frac{2r^2 \Delta P}{E(1 - r^2)} \quad [3]$$

Silicone is among the most gas permeable dense polymeric membrane materials known. Gases permeate silicone by a solution—diffusion mechanism, whereby the rate of gas permeation is directly proportional to the product of solubility of the gas, and the rate of diffusion of the dissolved gas in silicone.

The steady state rate of permeation $\dot{V}$ of a pure gas through the wall of a homogeneous and isotropic cylindrical tube (hollow fiber membrane) subject to a gas trans-membrane pressure $\Delta P$ is given by (Stern, 1977):

$$\dot{V} = K \frac{2\pi L \Delta P}{\ln(b/a)} \quad [4]$$

where K is the gas permeability coefficient, and L is the length of the hollow fiber. The permeability coefficient K is defined as the transport flux of a gas (rate of gas permeation per unit area—at standard temperature and pressure), per unit trans-membrane pressure driving force, for a unit membrane thickness. K is a function of temperature (and sometimes pressure) and can be calculated by measuring the steady state rate of permeation $\dot{V}$ of a pure gas through a flat sheet membrane of a known area A and thickness t when subjected to a trans-membrane pressure $\Delta P$ as:

$$K = \frac{\dot{V}(STP) \cdot t}{A \cdot \Delta P} \quad [5]$$

or by solving for K in Equation 4, if measuring $\dot{V}$ through a hollow fiber. The rate of permeating gas is measured in $cm^3$/sec (standard temperature and pressure), the membrane thickness in cm, the membrane surface area in cm² and the transmembrane pressure in cmHg (cm of mercury).

A frequently used unit of permeability is the Barrer commonly defined as $$1 Barrer = \frac{10^{-10} cm^3 (STP) \cdot cm}{cm^2 \cdot s \cdot cmHg} \quad [6]$$

For any given membrane material, gas permeability, and membrane thickness, the permeance is defined as the permeability of a specific gas divided by the wall thickness of the membrane (t)

$$permeance = \frac{K}{t}\left(\frac{Barrer}{\mu m}\right) \quad [7]$$

and is a measure of how fast a gas permeates across a specific membrane geometry, given a membrane area and gas TMP. The permeance enables a direct comparison between membranes of different materials, size and geometry such that a membrane with higher permeance requires less surface area to produce the same gas transfer compared to a membrane with lower permeance under the same gas TMP.

From the definition of permeance above, it is noted that a higher permeance can be achieved with a material with higher permeability and thinner walls. Thus a hollow fiber with thinner walls provides for a higher permeance than a hollow fiber of the same material and outside diameter with thicker walls. This is expected since the thicker wall imposes a higher resistance to gas permeation than the thinner wall.

On the other hand, according to Equation 3, a hollow fiber with thinner walls allows for higher deformation or strain upon subjecting to a positive TMP compared to a hollow fiber of the same material with thicker walls and same outside dimension ($r \rightarrow 1$, $\epsilon \leftarrow \infty$). Thus higher permeance and ability to withstand a higher TMP trend in opposite directions; thick walls have lower permeance but improved strain tolerance to higher TMP and thin walls have higher permeance but reduced tolerance to higher TMP.

An important performance constraint in hollow fiber design is the maximum acceptable hollow fiber deformation or strain at a maximum positive TMP. If the hollow fiber is allowed to deform too much under positive TMP, the passageway external to the hollow fiber, or the shell side of the membrane module will also deform with possible undesirable results. So the maximum acceptable strain at a given TMP must be specified, along with the membrane size and geometry. Equation 3 indicates that the strain is proportional to the TMP and inversely proportional to the modulus of elasticity E, suggesting that for a given TMP, a higher modulus E will result in a lower strain, and thus provide for improved strain tolerance to high TMP.

Silicone is a generic name for a wide variety of polymeric chains and networks constructed around a backbone of Si—O—Si, technically known as polysiloxanes, or just siloxanes. Polydimethylsiloxane (PDMS) is the basic and most commonly available silicone. Silicone elastomers are crosslinked silicone fluids and gums with a three-dimensional structure. The molecular weight of silicones fluids and gums included in compositions of the present invention are in the range of 200 and 30,000,000, inclusive. The structure of the silicone polymers included in compositions of the present invention is varied depending on the side groups attached to the Si—O—Si backbone as shown below:

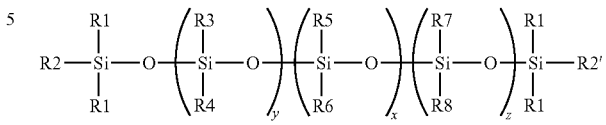

where each R1, R2, R2', R3, R4, R5, R6, R7 and R8 is independently selected from the group Consisting of: $CH_3$, $C_2H_5$, $C_3H_7$, $C_4H_9$, $F_3C_3H_4$, phenyl, $C_2H_3$, OH, $OCH_3$, epoxy, carbinol, methacrylate, acrylate and H. The number of repeating units, x, y, and z, is in the range of 3-22500, inclusive and can be extremely large for the gums with molecular weights as high as 30,000,000. Some of the side groups are reactive and become the crosslinking sites between polymer chains to form the cross-linked elastomer.

Crosslinked silicone polymers without any reinforcing filler have extremely poor mechanical properties. They are soft, flimsy, and can literally crumble under pressure. Silicone rubbers on the other hand are cross-linked elastomers with added reinforcing fillers such as silica and silicone resins, and a crosslinker that crosslinks the polymer molecules with each other. The fillers are used as reinforcement in silicones by embedding them within the polymer network, bonding them with the polymer, and/or by cross-linking functional groups on the fillers with functional groups in the polymer.

Fumed silicas are the most commonly used reinforcing fillers in silicone rubbers. Fumed silicas can be surface treated to improve the bond between the polymers and the filler, or to modify the rheology of the uncured silicone. The reinforced silicone-filler network is held together by silica-silica interactions and silica-polymer-silica bridge bonds between the silica aggregates. Filler/polymer chain entanglement is also responsible for reinforcement.

Untreated fumed silica provides siloxane, isolated hydroxyl, and hydrogen-bonded hydroxyl groups, which can interact with the silicone polymer and improve the reinforcing properties. Surface treatments such as hexamethyldisilazane (HMDZ), silicone oil, and other silanes with functional groups that react with the polymer can provide additional or different properties to the uncured and cured silicone rubber.

Some fillers are used to provide certain properties such as thermal conductivity (Boron nitride, silver flake, aluminum nitride), radio-opacity ($BaSO_2$), thermal stability (iron oxide, ZnO, $TiO_2$), colorations (pigments, dyes), electrical conductivity (graphite, silver, gold, copper, carbon black, silver coated spheres), rheology control (ground quartz, diatomaceous earth, calcium carbonate, calcium metasilicate, precipitated silica), and density control (microballoons) to the silicone. All these fillers including the fumed silica are considered particulate fillers because they comprise very small particles that are embedded in the polymer matrix.

Silicone resins, also called polysilsesquioxanes, are heavily crosslinked, three-dimensional networks of highly branched siloxane polymers, and can be used as fillers when clarity and a low viscosity of the uncured formulation is desired. Although not as permeable as the crosslinked linear polymer, resins are more gas permeable compared to silica, and thus allow for preserving some gas permeation properties.

Thus, in general, adding more reinforcing filler to the silicone provides for a silicone with higher modulus E and lower gas permeability.

It is concluded from the discussion above that the permeability K and modulus E trend in opposite directions with increased silicone filler content. Thus to obtain an improved silicone hollow fiber with improved permeance and strain tolerance to a high TMP it is important to understand the relationship between permeability and modulus of elasticity as a function of filler content. Other silicone properties that can affect the mechanical properties of silicone rubber are the silicone polymer chain length (molecular weight) and the crosslink density. Lower molecular weight silicones provide for stiffer elastomer with shorter elongation, whereas higher molecular weight silicones provide for a lower stiffness elastomer with longer elongation (tougher). Higher crosslink density also provides higher stiffness elastomers.

Although silicone rubbers are not linearly elastic in the full range of elastic deformation, in hollow fiber applications we are only concerned with small deformations or strains ($\epsilon$<0.1), so the modulus of elasticity E should be defined as the steady state engineering stress divided by the stain at a specified strain $\epsilon$, or $E_\epsilon$. This means that the modulus of elasticity is valid only for the specified strain E.

A steady state stress is specified because silicone rubbers may creep when subject to a sustained stress or strain, which means that at constant strain, the stress will typically decrease, and at constant stress, the strain will typically increase. Thus it is important to use the steady state values of stress and strain in obtaining the modulus. These values are typically obtained after several hours of sustained load, but may vary depending on creep time. Thus the stress-strain relationship may be obtained by measuring the steady-state engineering stress at progressively increasing fixed strains.

Currently, commercially available silicone rubbers are optimized for certain applications such as bumpers, seals, and caulking so the permeability and modulus of elasticity is not typically reported for a specific silicone formulation. More frequently reported is the durometer (which is a measure of the material stiffness), and the maximum percent elongation which is a measure of how much strain the rubber can tolerate under load before it fails. These are relevant mechanical properties for large scale silicone articles with dimensions greater than 0.5 mm in any direction.

However, membrane hollow fibers have very thin walls (typically less than 100 microns), and are expected to strain only a few percent ($\epsilon$<0.1) in expansion when subjected to positive TMP.

Present art self-supported dense silicone hollow fibers are limited for use with low positive TMP (less that 60 psi) because the modulus of elasticity of the silicone rubber is too low to prevent excessive deformation under higher positive TMP. These hollow fibers could be made with thicker walls to allow for higher TMP with less deformation, but increasing the wall thickness also reduces the permeance. So a balance is sought between permeance and pressure tolerance for the available silicone rubber properties.

Two commercially available silicone hollow fibers are presented in Table I below. Fibers obtained from the commercial modules were extracted and were tested under axial loading at room temperature (25° C.) and the stress was calculated based on the un-deformed hollow fiber cross-sectional area.

From Table I it is seen that the maximum specified pressure for all hollow fibers is less than 60 psi. It is also noted that for the Nagayanagi hollow fibers, as the wall thickness decreases, the maximum specified pressure also decreases, which is consistent with Equation 3 for a specified maximum allowable strain.

TABLE I

| Manufacturer | Product Number | CO2 Permeability (Barrer) | Fiber OD [3] (microns) | Wall Thickness [3] (microns) | Maximum Specified Pressure [3] (psi) | Measured Modulus (MPa) at % Strain [2] | | | | | |
|---|---|---|---|---|---|---|---|---|---|---|---|
| | | | | | | 1% | 2% | 3% | 4% | 5% | 6% |
| MedArray, Inc. | PDMSXA[1] | 2425 [2] | 300 | 55 | 45 | 10.3 | 10.0 | 9.5 | 8.8 | 8.0 | 7.5 |
| Nagayanagi | M80 | 1530 [3] | 360 | 80 | 56.8 | 8.3 | 7.2 | 6.8 | 6.6 | 6.5 | 6.4 |
| | M60 | | 320 | 60 | 42.6 | | | | | | |
| | M40[4] | | 250 | 40 | 28.4 | | | | | | |

[1] Multiple models have the same hollow fiber size and specification.
[2] Measured from product hollow fibers
[3] Listed on web site or specification page
[4] Model tested Note that in the range of strain under consideration for hollow fibers (<10%), the modulus decreases with increasing strain. So the highest modulus is typically seen at the lowest strain. While it is theoretically possible to use the above silicone rubber formulations for forming smaller, thinner wall dense hollow fibers that can tolerate higher TMP within an acceptable strain, other limitations such as increased processing time (for same membrane surface area), increased care in handling a smaller and more delicate fiber, and higher processing cost become relevant and undesirable consequences with smaller hollow fibers. Other application specific disadvantages include higher frictional pressure drop in the lumen side flow through smaller hollow fibers, and the possibility of fowling and plugging the smaller lumens if particulates are present.

A variety of gas permeating applications suitable for silicone membranes, such as natural gas purification, compressed air dehydration, and many liquid degassing and gassing applications, require the ability to tolerate high positive TMP (higher than 60 psi) with a hollow fiber outside diameter in the range between 200 and 500 microns. Thus, a silicone rubber with properties for forming a homogeneous self-supported highly permeable silicone hollow fiber suitable for use in high trans-membrane pressure applications is needed. It is one objective of the present invention to provide for A silicone rubber gas permeable dense hollow fiber with improved permeance and improved strain tolerance to positive TMP An improved silicone rubber formulation for forming hollow fibers with improved permeance and improved strain tolerance to positive TMP.

As mentioned previously, it is possible to increase the modulus of elasticity of silicone rubbers by increasing the reinforcing filler content, but this typically has the concomitant effect of reduced permeability. Thus, understanding the effect of filler content on modulus and permeability is essential in improving the silicone rubber permeance for a specified TMP, fiber dimensions, and maximum allowable strain.

Unlike glassy polymers, for rubbery polymers such as silicone, the permeation of gases is primarily determined by the solubility of the gas in silicone, and not the size of the molecule. In fact many large organic vapors permeate through silicone at higher rates compared to much smaller molecules such as Nitrogen ($N_2$) because the solubility of organic molecules in silicone is much higher than that of $N_2$.

Carbon Dioxide ($CO_2$) is also more soluble than $N_2$ in silicone and has a permeability of one order of magnitude higher; the reported permeability of $CO_2$ in silicone is 2,977 Barrer whereas the permeability of $N_2$ is 257 Barrer (corrected to standard pressure and temperature from: Robb, 1968).

$CO_2$ is a highly permeable, non-toxic, non-flammable, readily available gas at room temperature and moderate pressure that provides a good baseline indication of the overall gas permeability properties for all gases in silicone formulations. While permeability of other gases may or may not change in the same proportion as it does for CO2 from one silicone formulation to another, the permeabilities will likely change in the same direction. Thus an increase in permeability to $CO_2$ suggests an increase of the permeability of other gases.

Thus the permeability of $CO_2$ in silicone rubber is used as the baseline (control) permeability in conjunction with the mechanical properties of the silicone rubber in establishing an optimal combination of these properties as a function of filler content for forming silicone hollow fibers with improved permeance, and improved tolerance to strain under a positive TMP.

The effect of increasing filler content on the $CO^2$ permeability and modulus was investigated with various silicone formulations using addition cured (platinum catalyzed) silicone chemistry. Addition cured silicone elastomers are commonly referred to as platinum catalyzed silicones and are frequently packaged as two-part systems with each part containing different functional components. These two component systems can be formulated in various ratios, with the most common ratios being 10:1 and 1:1. Generally, the Part A component contains vinyl functional silicones and the platinum catalyst at a level of 5-10 ppm (usually a complex of platinum in alcohol, xylene, divinylsiloxanes or cyclic vinylsiloxanes), whereas Part B contains vinyl functional polymer, hydrogen-functional crosslinker, and cure inhibitor. Cure inhibitors and moderators are additives used to adjust the cure rate of the system. Low molecular weight vinylmethylsiloxanes can be used as moderators for vinyl-addition cure silicones. They also are reactive intermediates and monomers. Addition cure chemistry provides an extremely flexible basis for formulating silicone elastomers. An important feature of the cure system is that no byproducts are formed, allowing fabrication of parts with good dimensional stability. Cures below 50° C., Room Temperature Vulcanizing (RTV), cures between 50° and 130° C., Low Temperature Vulcanizing (LTV), and cures above 130° C., High Temperature Vulcanizing (HTV), are all readily achieved by addition cure. The viscosity of the systems can also be varied widely, ranging from flowable liquids to conventional heat-cure rubber (HCR) processing.

The cure chemistry involves the direct addition of the Si—H functional crosslinker to the vinyl functional polymer forming an ethylene bridge crosslink. The vulcanization of addition cured silicone elastomers can be heat accelerated to within seconds at high temperatures.

While the testing and some particular compositions described herein pertain to vinyl addition cure chemistry silicones, other cure chemistries are useful to form silicone rubbers of the present invention with similar permability properties, including peroxide activated cure, moisture cure, condensation cure, radical (including UV) cure, epoxy addition cure, metal salt cure, etc. Such silicone cure mechanisms are well understood by those skilled in the art, and can be used with the silicone chemical structure presented above by choosing appropriate reactive and non-reactive side (R) groups attached to the Si—O—Si backbone.

Additional Details of Various Silicone Cure Systems Used According to Aspects of the Present Invention Vinylmethylsiloxane copolymers and vinyl T-structure fluids are mostly used in peroxide activated cure systems which involve peroxide induced free radical coupling between vinyl and methyl groups. Simultaneous and subsequent reactions take place among methyl groups and between crosslink sites and methyl groups. Vinylmethylsiloxane-dimethylsiloxane copolymers of extremely high molecular weights are the typical base stocks for peroxide activated cure silicone elastomers. The base stocks are commonly referred to as gums with molecular weights from 500,000 to 900,000. Free radical coupling (cure) of vinyl and methyl groups is usually initiated by peroxides at process temperatures of 140°-160°. Generally, peroxide loading is 0.2-1.0%. Following the cure, a post-cure at 25-30° higher temperature removes volatile peroxide decomposition products and stabilizes polymer properties. The most widely used peroxides include dibenzoylperoxide (often as a 50% concentrate in silicone oil), dicumylperoxide (often 40% on calcium carbonate), 2,5-dimethyl-2,5-di-t-butylperoxyhexane and bis(dichlorobenzoyl) peroxide. The last peroxide is particularly recommended for aromatic containing siloxanes. Terpolymer gums containing low levels of phenyl are used in low temperature applications. At increased phenyl concentrations, they are used in high temperature and radiation resistant applications and are typically compounded with stabilizing fillers such as iron oxide. Phenyl groups reduce cross-linking efficiency of peroxide systems and result in rubbers with lower elasticity. Fluorosilicone materials offer solvent resistance. Lower molecular weight vinylsiloxanes are frequently added to modify processability of base stocks.

Hydride functional siloxanes undergo three main classes of reactivity: hydrosilylation (described earlier for platinum addition cure), dehydrogenative coupling and hydride transfer. In dehydrogenative coupling, hydroxyl functional materials react with hydride functional siloxanes in the presence bis(2-ethylhexanoate)tin, dibutyldilauryltin, zinc octoate, iron octoate or a variety of other metal salt catalysts. Silanol terminated polydimethylsiloxanes react with hydride functional siloxanes to produce foamed silicone materials. The presence of oxygen and moisture also influences cross-link density and foam structure.

Silanol functional polymers with terminal silanol groups render polydimethylsiloxanes susceptible to condensation under both mild acid and base conditions. They are intermediates for most room temperature vulcanizeable (RTV) silicones. Condensation cure one-part and two-part RTV systems are formulated from silanol terminated polymers with molecular weights ranging from 15,000 to 150,000. One-part systems are crosslinked with moisture-sensitive multi-functional silanes in a two stage reaction. In the first stage, after compounding with fillers, the silanol is reacted with an excess of multi-functional silane. The silanol is in essence displaced by the silane. The second stage of the reaction takes place upon use. When the end groups are exposed to moisture, a rapid crosslinking reaction takes place.

The most common moisture cure systems are: Acetoxy, Enoxy, Oxime, Alkoxy, Amine. The crosslinking reaction of alkoxy systems are catalyzed by titanates, frequently in combination with tin compounds and other metal-organics.

Acetoxy one-part systems usually rely solely on tin catalysts. The tin level in one-part RTV systems is minimally about 50 ppm with a ratio of ~2500:1 for Si—OR to Sn, but typical formulations have up to ten times the minimum. Other specialty crosslinking systems include benzamido and mixed alkoxyamino. The organic (non-hydrolyzeable) substituents on the crosslinkers influence the speed of cure. Among the widely used crosslinkers vinyl substituted is the fastest, then methyl, then ethyl, then phenyl.

Two-part condensation cure silanol systems employ ethylsilicates (polydiethoxysiloxanes) as crosslinkers and dialkyltincarboxylates as accelerators. Tin levels in these systems are minimally 500 ppm, but typical formulations have up to ten times the minimum. Two-part systems are inexpensive, require less sophisticated compounding equipment, and are not subject to inhibition.

Methacrylate and Acrylate functional siloxanes undergo radical induced polymerization. Copolymers with greater than 5 mole % methacrylate substitution crosslink to give non-flowable resins. Acrylate functional siloxanes cure faster than methacrylate functional siloxanes on exposure to UV in the presence of a photoinitiator such as ethylbenzoin.

Table II summarizes additional details of various silicone cure systems used according to aspects of the present invention. The terms "polymer (a)" and "polymer (d)" correspond to "polymer (a)" and "polymer (d)" referred to in the claims and Summary of the present application.

TABLE II

| Cure Mechanism | Polymer (a) | Polymer (d) | Catalyst |
|---|---|---|---|
| Vinyl addition (platinum cure) 2-Part | Vinyl terminated PolyDimethylsiloxanes Vinyl Terminated Diphenylsiloxane-Dimethylsiloxane Copolymers Vinyl Terminated polyPhenylMethylsiloxane VinylPhenylMethyl Terminated VinylPhenylsiloxane-PhenylMethylsiloxane Copolymer Vinyl Terminated TrifluoropropylMethylsiloxane-Dimethylsiloxane Copolymer Vinyl Terminated Diethylsiloxane-Dimethylsiloxane Copolymers Vinylmethylsiloxane-Dimethylsiloxane Copolymers, trimethylsiloxy terminated Vinylmethylsiloxane Homopolymers Vinylmethylsiloxane Terpolymers | Hydride Terminated PolyDimethylsiloxanes MethylHydrosiloxane-Dimethylsiloxane Copolymers, Trimethylsiloxy terminated polyMethylHydrosiloxanes, Trimethylsiloxy terminated polyEthylHydrosiloxane, Triethylsiloxy terminated polyPhenyl-(DiMethylHydrosiloxy)siloxane, hydride terminated MethylHydrosiloxane-PhenylMethylsiloxane copolymer, hydride terminated MethylHydrosiloxane-OctylMethylsiloxane copolymers and terpolymers | Platinum and noble metal catalysts |
| Vinyl addition (platinum cure) 1-Part | MonoVinyl Monohydride Teminated PolyDimethylsiloxanes | | Platinum and noble metal catalysts |
| Peroxide activated cure | Same as for vinyl addition 2-Part (platinum cure) but mostly Vinylmethylsiloxane-Dimethylsilxane Copolymers (fluids and gums) | | Dibenzoylperoxide, dicumylperoxide, 2,5-dimethyl-2,5-di-t-butylperoxyhexane and bis(dichlorobenzoyl) peroxide |
| Moisture Cure (1 part) | Silanol Terminated PolyDimethylsiloxanes Silanol Terminated Diphenylsiloxane-Dimethylsiloxane Copolymers Silanol Terminated PolyDiphenylsiloxane Silanol Terminated PolyTrifluoropropylMethylsiloxane | Moisture sensitive multifunctional silanes, Acetoxy, Enoxy, Oxime, Alkoxy, Amine Crosslinkers | Moisture |
| Condensation Cure (2 part) | Hydroxyl functional-Same as moisture cure 1-Part | Ethylsilicates (polydiethoxysiloxane) | Dialkyltincarboxylates |
| Dehydrogenative Coupling Metal salt cure | Hydroxyl functional-Same as moisture cure 1-Part | Hydride functional-Same as vinyl addition cure 2-Part | bis(2-ethylhexanoate)tin, dibutyldilauryltin, zinc octoate, iron octoate, other metal salts |
| Radical (including UV) cure | Acrylate Functional Siloxanes | | cationic photoinitiators, ethylbenzoin + UV light |

First, the effect of resin filler content and silicone polymer molecular weight, was investigated. The following silicone components were obtained from Gelest, Inc. (Morrisville, Pa.):

Vinyl terminated PolyDimethylsiloxanes in the following molecular weights: 49,500, and 155,000 (DMS-V35 and DMS-V52) as vinyl functional silicone polymers Vinyl Q resins dispersion in Xylene (VQX-221) as a reinforcing filler Polymethylhydrosiloxanes, Trimethylsiloxy terminated (HMS-991) as a hydrogen-functional crosslinker Vinylmethylsiloxane homopolymers (VMS-005) as cure rate retarder Platinum-Divinyltetramethyldisiloxane complex (SIP6831.2) as a catalyst.

Each vinyl terminated polydimethylsiloxane with different molecular weight was mixed with the other components in specific proportions resulting in silicone rubber formulations with the following properties shown in Table III.

TABLE III

| | |
|---|---|
| % resin (by weight) in final silicone rubber | 40-65 |
| Hydride to Vinyl ratio (H:Vi) | 2:1 |
| % (by weight) Vinyl cyclic monomer (Vinylmethylsiloxane) | 3.0 |

The hydride to vinyl ratio (H:Vi) of the silicone rubber is calculated as the ratio by mole of groups in the hydride functional polymers to the $CH_2=CH-Si$ groups in the vinyl functional polymers. The resin dispersion was mixed with the vinyl functional polymer, and the solvent from the resin was allowed to flash off for a final solids content of between 60% and 90%. Then the vinylmethylsiloxane cyclic monomer and the platinum catalyst (15-30 ppm platinum) were added and thoroughly mixed before the crosslinker was added and mixed to produce the uncured silicone rubber.

The mixture was used to cast a flat sheet membrane with a thickness between 80 to 200 microns to measure modulus and permeability. The permeability was measured using a permeation cell with pure $CO_2$ (20° C.-26° C., 15 psi TMP, vented to the atmosphere) using the continuous flow method described by Czichos (2007).

Strips of known thickness and width were cut from the above cast membrane and prepared as tensile samples with an active length of 50 mm and used to measure the modulus $E_\epsilon$ in axial loading, at strain levels E ranging from 0.01 (1%) to 0.1 (10%) at room temperature (20° C.-25° C.). It was assumed that the silicone samples were isotropic so that $E_\epsilon$ measured axially is assumed equal in all directions.

Similarly, the effect of silica filler was investigated separately by using an hexamethyldisilazane (HMDZ) treated fumed silica (CAB-O-SIL TS-530, Cabot Corporation, Boston Mass.) added and thoroughly mixed at various levels to a vinyl terminated polydimethylsiloxane (DMS-V31, Gelest, Inc. Morrisville, Pa.), and cross-linked into a silicone rubber using the same hydrogen functional crosslinker, inhibitor, and platinum catalyst as described for the resin filled samples above. A solvent was added to ease the mixing and casting the flat sheet. The resulting silicone rubber had the following properties shown in Table IV.

TABLE IV

| | |
|---|---|
| % silica (by weight) in final silicone rubber | 15-40 |
| Hydride to Vinyl ratio (H:Vi) | 2.5:1 |
| % (by weight) Vinyl cyclic monomer (Vinylmethylsiloxane) | 3.0 |

Finally, the effect of combining the silica filler with the resin filler was investigated using a fumed silica reinforced (15-18%) vinyl terminated polydimethylsiloxane (DMS-V31S15, Gelest, Inc. Morrisville, Pa.), and adding resin filler at different levels as indicated above. The resulting silicone rubber had the following properties shown in Table V.

TABLE V

| | |
|---|---|
| % silica (by weight) in final silicone rubber | 12.1-9.2 |
| % resin (by weight) in final silicone rubber | 15-30 |
| Hydride to Vinyl ratio (H:Vi) | 2.5:1 |
| % (by weight) Vinyl cyclic monomer (Vinylmethylsiloxane) | 3.0 |

Results

Figure 2:
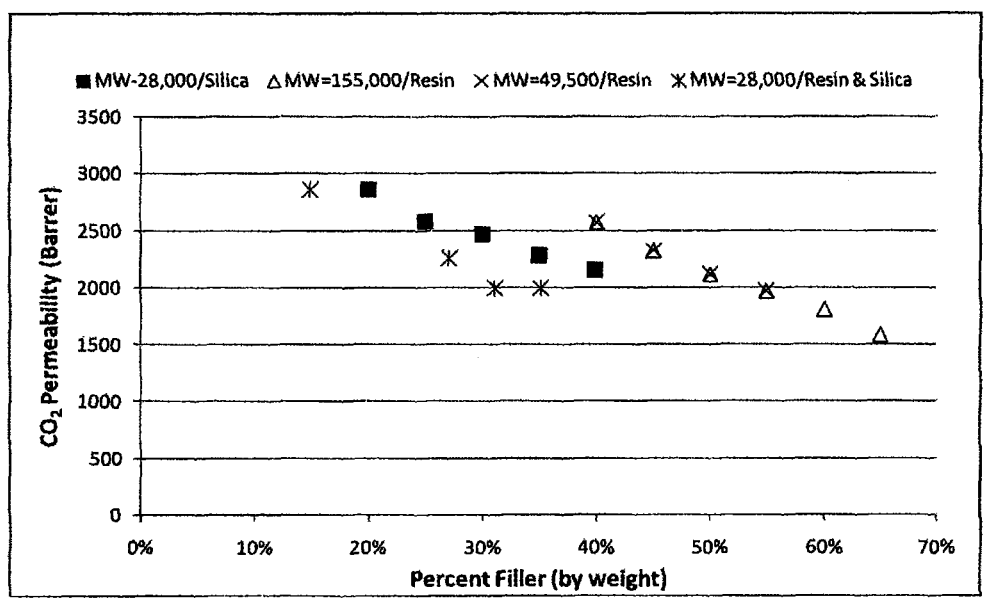
FIG. 2 is a graph showing $CO_2$ permeability as a function of the percent filler.
Figure 3:
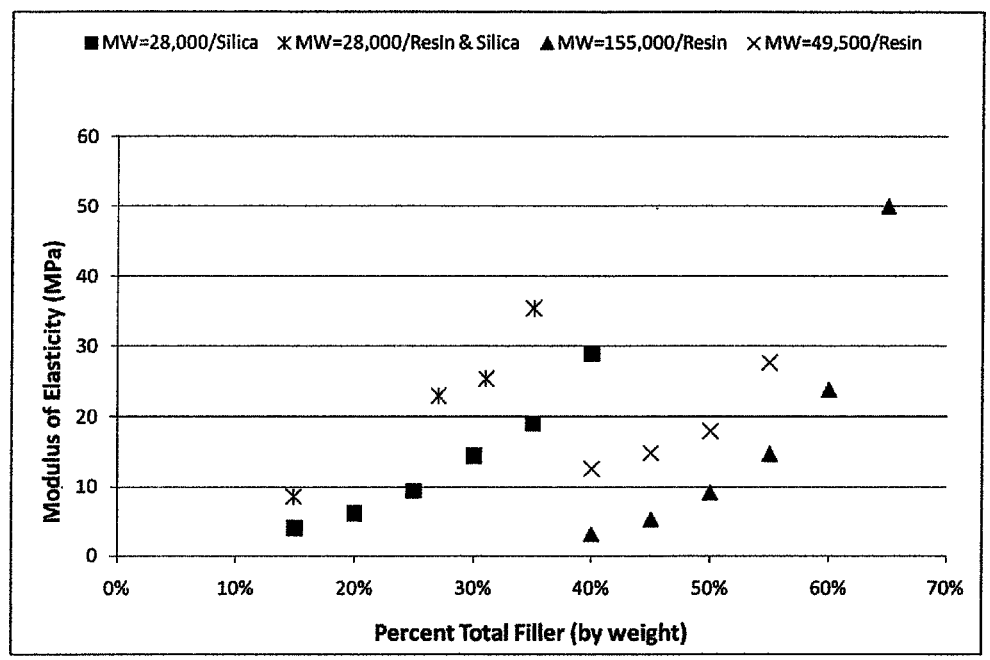
FIG. 3 is a graph showing the modulus of elasticity as a function of the percent filler.

The $CO_2$ permeability and modulus $E_\epsilon$ for all the silicone rubber formulations as a function of percent filler content (by weight) are presented in FIGS. 2 and 3 respectively. Note that in FIG. 2 the permeability decreases with increased filler in a fairly linear fashion for all formulations, regardless of filler. Also note that the permeability for the resin filled formulations with different molecular weights are superimposed on one another, suggesting that the molecular weight of the silicone molecule has very little effect on the permeability. Also note that the silica filled formulations can achieve higher permeabilities at lower loading (by weight) compared to the resin filled formulation, and that the combined silica and resin filled formulations can achieve higher permeability for the same total loading (by weight) compared to silica alone. So silica combined with resin as fillers can achieve the highest permeability at the same total filler loading.

On the other hand, as shown in FIG. 3, the modulus $E_\epsilon$ increases with increased total filler content. Note that the modulus for the larger molecular weight silicone filled with resin had a lower modulus compared to the lower molecular weight silicone similarly filled with resin. This suggests that the larger molecular weight silicone provides for more mobility and flexibility compared to the smaller molecular weight silicone, as would be expected due to the longer polymer length and the decreased crosslink density found in the higher molecular weight rubber.

It is also noted that the silica filled formulation produced higher modulus compared to the resin filled formulations for the same total filler content by weight, and the combined silica-resin filled formulations produced higher modulus compared to the silica filled formulation for the same total loading by weight.

Note that the modulus data presented in FIG. 3 corresponds to a 3% strain. Nonetheless, for all values of strain between 1% and 10%, the modulus increased with filler content in a similar fashion as shown in FIG. 3, and in general decreased with increased stain, indicating that the modulus is typically higher at lower strain levels. It should be noted that the highest levels or creep were observed with the formulations filled with only resin and the lowest with the formulations filled with only silica, suggesting the Q resin used in the present study imparts some viscoelastic properties.

It is observed from FIGS. 2 and 3 that in all cases, as the total filler content increased, the percent increase in modulus was higher than the percent decrease in permeability, suggesting that overall benefits may be gained with increased filler loading in regards to an improved silicone rubber for forming gas permeable hollow fibers.

The product of the permeability and modulus of elasticity ($K_{CO_2} \cdot E_\epsilon$) termed here the permeability modulus product or PMP (with units of Barrer*MPa) for the silicone rubber formulation is unique to the formulation and independent of the fiber geometry or TMP. The PMP is an indicator of the ability of the silicone rubber formulation to produce a certain permeance per unit strain when formed into a hollow fiber of a specified dimension and subject to a specified TMP. This can be explained mathematically by solving for K in Equation 7 and substituting in the definition of PMP $$PMP = E_\epsilon \cdot K_{CO_2} = \frac{2r^2 \Delta P}{\epsilon(1-r^2)} t \cdot \text{permeance} \quad [8]$$

Substituting b(1−r) for t and rearranging, we obtain:

$$PMP = \frac{2br^2 \Delta P}{(1+r)} \cdot \frac{\text{permeance}}{\epsilon} \quad [9]$$

It should be noted that the PMP as defined above is the product of the $CO_2$ permeability, $K_{CO_2}$, and the modulus $E_\epsilon$, which means that the permeance in Equations 8 and 9 refers to the $CO_2$ permeance. While the PMP can be defined in terms of any gas permeability and permeance, in this context it is defined in terms of CO2 and hereby denoted as $PMP_{CO2}$.

Also, the modulus $E_\epsilon$ in the calculation of PMP and the strain E must correspond to each other since $E_\epsilon$ is specified for a value of $E_\epsilon$.

Note that the first term on the right of Equation 9 is dependent only on geometric parameters and TMP; whereas the second term is the ratio of the permeance to the strain $\epsilon$. This suggest that the $PMP_{CO2}$ is directly proportional to the permeance and inversely proportional to the strain for any given hollow fiber geometry and TMP. Thus for any given hollow fiber size and geometry, as the $PMP_{CO2}$ increases so does the permeance per unit allowable strain at any given TMP.

Thus the objective of the present invention to provide a silicone hollow fiber with improved permeance and reduced strain are fulfilled by providing a silicone rubber formulation for forming a hollow fiber with a $PMP_{CO2}$ value above present art hollow fibers. Note that the highest $PMP_{CO2}$ for the present art silicone hollow fibers in Table I can be calculated as 25,027 Barrer*MPa, for MedArray's PDMXA-hollow fiber silicone formulation at a 1% strain. As mentioned earlier, the $PMP_{CO2}$ is a property of the silicone material and not the hollow fiber dimensions. Clearly a higher $PMP_{CO2}$ would provide for a silicone formulation for forming into hollow fibers with higher permeance at the same maximum allowable strain.

Thus it can be established that a silicone formulation with a $PMP_{CO2}$ of 30,000 Barrer*MPa or greater, will provide for an improved silicone formulation for forming hollow fibers with improved permeance and improved tolerance to strain at positive TMP compared to present art silicone hollow fibers.

Figure 4:
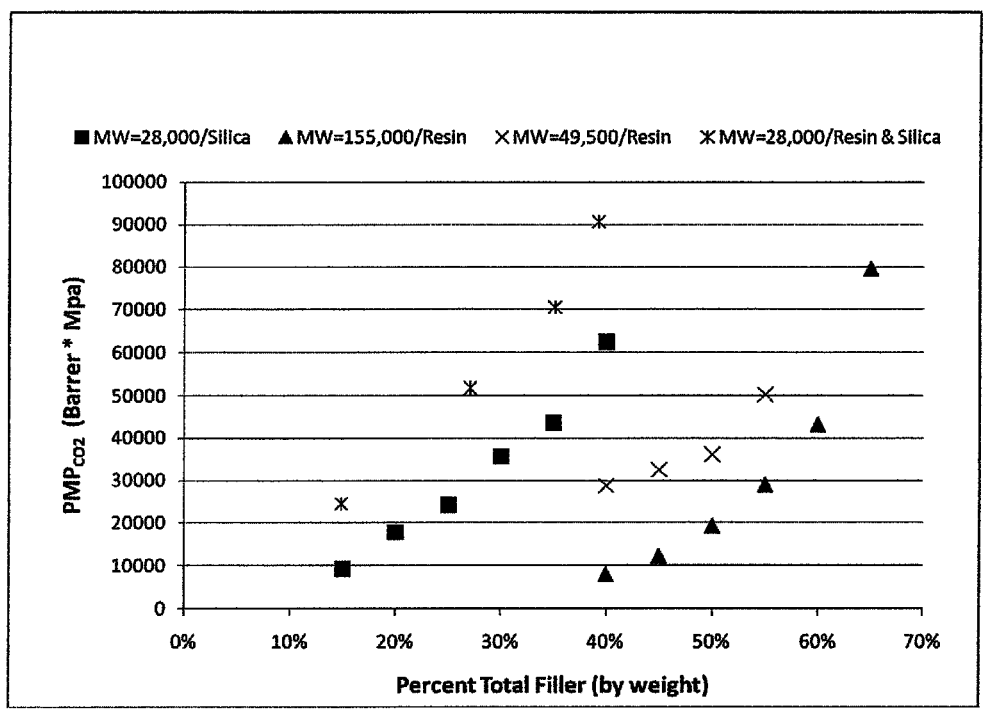
FIG. 4 is a graph showing $PMP_{CO_2}$ as a function of the percent filler.

The values of $PMP_{CO2}$ as a function of total filler content for all formulations are presented in FIG. 4. Note that the highest values of $PMP_{CO2}$ at the lowest filler loading content are achieved with formulations with the combined silica-resin filler, then with formulations with only silica filler, and finally with formulations with only resin filler. Thus all formulations in FIG. 4 with a $PMP_{CO2}$ above 30,000 are formulations with improved properties over current art silicone hollow fiber formulations.

Exemplary curable compositions of the present invention are shown in Table VI were prepared, cured and formed into flat sheets for characterization of properties, with the results shown in Table VII. The terms "polymer (A)" and "polymer (B)" in Table VI correspond to "polymer (a)" and "polymer (d)", respectively, referred to in the claims and Summary of the present application. Note that the $PMP_{CO2}$ listed for each formulation corresponds to the value calculated at 3% strain. Typically the $PMP_{CO2}$ is highest at lower strain levels and decreases with increasing strain.

TABLE VI

| | Formulation No→ | | | |
| --- | --- | --- | --- | --- |
| | 1 | 2 | 3 | 4 |
| Parts vinyl functional polymer (A) | 41.4 (DMS-V35) | 55.4 (DMS-V31) | 61.0 (DMS-V31S15) | 23.1 (DMS-V35) |
| x (approx) in polymer "A" structure (y = 0, z = 0) | 666 | 376 | 376 | 666 |
| Parts crosslinker polymer (B) (HMS-991) | 10.6 | 6.6 | 8.93 | 13.9 |
| x (approx) in polymer "B" structure (y = 0, z = 0) | 24 | 24 | 24 | 24 |
| Parts platinum complex catalyst (SIP6831.2) | 0.085 | 0.085 | 0.085 | .085 |
| Parts inhibitor bath life extender (VMS-005) | 3.0 | 3.0 | 3.0 | 3.0 |
| % MQ resin | 45 | 0 | 15 | 60 |
| % silica (particulate filler) (by weight) | 0 | 35 | 12.1 | 0 |
| Hydride to Vinyl groups ratio (H:Vi) | 2:1 | 2.5:1 | 2.5:1 | 2.25:1 |
| % solids when forming membrane (remainder is Xylene as solvent) | 86.9 | 42.1 | 48.8 | 72.0 |

TABLE VII

| | | | | |
| --- | --- | --- | --- | --- |
| $CO_2$ permeability ($K_{CO_2}$, Barrer) | 2182 | 2288 | 2260 | 1569 |
| Modulus 1% strain ($E_\epsilon$, MPa) | 17.6 | 19.7 | 23.5 | 68.0 |
| Modulus 2% strain ($E_\epsilon$, MPa) | 16.5 | 19.2 | 23.2 | 70.6 |
| Modulus 3% strain ($E_\epsilon$, MPa) | 14.9 | 17.8 | 22.9 | 61.1 |
| Modulus 4% strain ($E_\epsilon$, MPa) | 14.2 | 17.3 | 22.6 | 55.0 |
| Modulus 5% strain ($E_\epsilon$, MPa) | 13.3 | 16.6 | 21.9 | 50.2 |
| Modulus 6% strain ($E_\epsilon$, MPa) | 12.7 | 16.1 | 21.1 | 46.4 |
| Modulus 7% strain ($E_\epsilon$, MPa) | 12.1 | 15.9 | 20.7 | 42.7 |
| Modulus 8% strain ($E_\epsilon$, MPa) | 11.6 | 15.5 | 20.3 | 39.9 |
| Modulus 9% strain ($E_\epsilon$, MPa) | 11.3 | 15.3 | 20.0 | 37.6 |
| Modulus 10% strain ($E_\epsilon$, MPa) | 11.0 | 15.2 | 19.8 | 35.5 |
| $PMP_{CO2}$ (3%) (Barrer*MPa) | 32,512 | 40,726 | 51,754 | 95,913 |

Thus it can be concluded that it is possible to increase the $PMP_{CO2}$ by increasing the level of filler content. The filler can be selected depending on the desired viscosity of the uncured rubber, and the level of tolerable creep the final hollow fiber is allowed to undergo.

Using the silicone rubber formulation property $PMP_{CO2}$ it is possible to ascertain if such formulation will result in a hollow fiber with improved permeance and improved strain tolerance to positive TMP. Using the $PMP_{CO2}$ for present art silicone rubber formulations, we have established that a hollow fiber with improved permeance and improved strain tolerance to positive TMP, requires a $PMP_{CO2}$ of 30,000 (Barrer*MPa) or higher.

Moreover, the results presented here provide the composition for an improved silicone rubber formulation for forming hollow fibers with improved permeance and improved strain tolerance to positive TMP, compared to present art silicone formulations.

While the present invention describes a silicone formulation for forming a homogeneous hollow fiber with improved permeance and improved strain tolerance to positive TPM, the formulations of the present invention also has utility in other types of hollow fibers such as, asymmetric, and composite. Dense homogeneous and asymmetric hollow fibers are composed entirely of the same permeable material, that is, the walls of the hollow fiber are made from one gas permeable material. The difference between dense homogeneous and asymmetric is that in the dense homogeneous hollow fiber the entire wall structure is dense and uniform, whereas in the asymmetric hollow fiber there are both porous and dense structures in the wall of the hollow fiber.

In a composite membrane there are two or more membrane materials forming the wall of the hollow fiber. The structure of one of the materials may be porous. Composite silicone hollow fibers typically have a thin coating, or "skinned" layer of dense silicone over a porous supporting substrate composed of a material that is not highly permeable such as polysulfone or polypropylene.

The present invention applies to silicone based dense homogeneous, asymmetric, and composite hollow fibers where one layer is silicone.

Hollow fibers can be formed using the improved silicone rubber formulations of the present invention using methods well known to those skilled in the art. Forming tubes and hollow fibers (micro-tubes) with silicones has been commonly performed by extrusion of high consistency uncured silicone rubber through a tubing die, and heating the formed silicone tube to cross-link and cure the silicone to permanently retain its shape. The improved silicone formulations of the present invention can also be extruded and cured into hollow fibers by adjusting the consistency of the uncured silicone formulation to a suitable processing consistency. Adjustments in the consistency can be accomplished by reducing (or eliminating) any solvent content and by increasing the viscosity (molecular weight) of the base polymers.

Silicone hollow fibers using compositions of the present invention can also be formed using methods described in U.S. Pat. Nos. RE41870; 5,698,161, and U.S. patent application Ser. No. 12/915,262, all incorporated by reference herein in their entirety.

According to U.S. Pat. No. RE41870, a thin-walled microtube (hollow fiber) is formed by providing a continuous elongated member having an outer surface. The elongated member is at least partially formed of a soluble material. A coating material is then provided, with the coating material being a silicone compound. The silicone structure is curable so as to form a substantially non-porous silicone. The outer surface of the elongated member is coated with the coating material so as to form a substantially uniform and continuous layer on the outer surface of the elongated member. The layer of coating material is then cured, and the elongated member is dissolved and purged from the layer of coating material. This leaves a micro-tube formed of silicone.

According to a further aspect of the present invention, the hollow fibers formed according to the present invention may be assembled into a bundle defining two ends, potting the bundle ends in a potting material so as to form potted ends sealing the outer surface of the hollow fibers to each other, cutting through the potted ends such that the hollow fibers are cut, thus at least partially exposing the hollow fiber inner lumen and any support fiber or elongated soluble member therein. Then, if present, the inner elongated support fiber or elongated soluble member contained therein is removed thus leaving behind the inner-lumen of the hollow fibers exposed.

The potted ends of the hollow fiber bundle may be sealed within a housing such that the inner and outer passageways of the hollow fiber bundle are separated with separate access ports to each passageway.

REFERENCES

[1] Higdon, A., et al., *Mechanics of Materials*, John Wiley & Sons, New York, 1976
[2] Stern, S. A., et al., The Permeation of Gases Through Hollow Silicone Rubber Fibers: Effect of Fiber Elasticity on Gas Permeability, AIChE Journal 1977 Vol. 23 No. 4: p. 567.
[3] Robb W. L., Thin Silicone Membranes-Their Permeation Properties and some Applications. Ann NY Acad Sci 1968 January; 146(1): 119-37.
[5] Czichos H. et al., (Eds), Springer Handbook of Materials Measurement Methods, Springer 2007

The invention claimed is:
1. A silicone hollow fiber having a wall, the wall generally enclosing and defining an interior space, the wall having an internal surface adjacent the interior space and an opposed external surface, the wall extending between a first end and a second end; the wall comprising a reaction product of a curable composition comprising:
  a) one or more siloxane polymers having the structural formula:

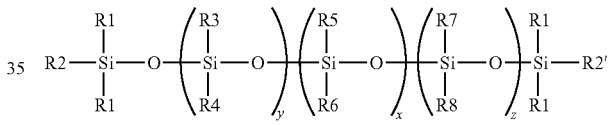

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2CF_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;
  b) a silicone resin in an amount in the range of 40-80 parts per hundred, the silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2CF_3$, phenyl, $CH=CH_2$, OH, epoxy, carbinol, methacrylate, acrylate and H; and Q Resin having the structural formula:

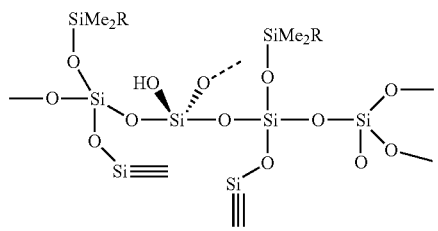

where each R is independently selected from the group consisting of: $CH_3$, $CH_2CH_3$, $CH_2CH_2CH_3$, $CH_2CH_2CH_2CH_3$, $CH_2CH_2CF_3$, phenyl, $CH=CH_2$, OH, epoxy, carbinol, methacrylate, acrylate and H; and combinations of any two or more thereof; and c) a catalyst, wherein the reaction product is characterized by a $PMP_{CO2}$ greater than 30,000 Barrer*MPa.

2. The silicone hollow fiber of claim 1, wherein the wall comprises a reaction product of the curable composition and is characterized by a $PMP_{CO2}$ greater than 50,000 Barrer*MPa.

3. The silicone hollow fiber of claim 1, wherein the wall comprises a reaction product of the curable composition and is characterized by a $PMP_{CO2}$ greater than 70,000 Barrer*MPa.

4. A bundle of silicone hollow fibers with a $PMP_{CO2}$ greater than 30,000 Barrer*MPa comprising a reaction product of a curable composition, the curable composition comprising:

a) one or more siloxane polymers having the structural formula:

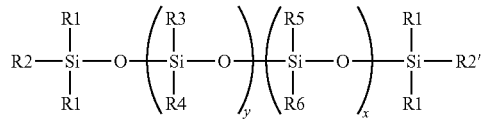

where each R1, R2, R2', R3, R4, R5, R6, R7 and R8 is independently selected from the group consisting of: $CH_3$, $CH_2CH_3$, $CH_2CH_2CH_3$, $CH_2CH_2CH_2CH_3$, $CH_2CH_2CF_3$, phenyl, $CH=CH_2$, OH, $OCH_3$, epoxy, carbinol, methacrylate, acrylate and H; where at least one of x, y and z is present, where x is absent or is an integer in the range of 1-2500, inclusive, where z is absent or is an integer in the range of 1-2500, inclusive, and where y is absent or is an integer in the range of 1-20000, inclusive;

b) a silicone resin in an amount in the range of 40-80 parts per hundred, the silicone resin selected from the group consisting of: polysilsesquioxane; T-resin of the composition $RSiO_{1.5}$, where R is selected from: $CH_3$, $CH_2CH_3$, $CH_2CH_2CH_3$, $CH_2CH_2CH_2CH_3$, $CH_2CH_2CF_3$, phenyl, $CH=CH_2$, OH, epoxy, carbinol, methacrylate, acrylate and H; and Q Resin having the structural formula:

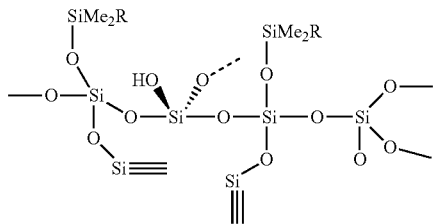

where each R is independently selected from the group consisting of: $CH_3$, $CH_2CH_3$, $CH_2CH_2CH_3$, $CH_2CH_2CH_2CH_3$, $CH_2CH_2CF_3$, phenyl, $CH=CH_2$, OH, epoxy, carbinol methacrylate, acrylate and H; and combinations of any two or more thereof; and c) a catalyst.

5. The silicone hollow fiber of claim 1, wherein the curable composition further comprises a particulate filler.

6. The bundle of silicone hollow fibers of claim 4, wherein the curable composition further comprises a particulate filler.

* * * * *